United States Patent
Hauzie, Jr.

(10) Patent No.: US 6,505,412 B2
(45) Date of Patent: Jan. 14, 2003

(54) PIPEFITTER'S PROTRACTOR

(76) Inventor: Eugene Hauzie, Jr., 316 County Park Rd., Ebensburg, PA (US) 15931

( * ) Notice: Subject to any disclaimer, the term of this patent is extended or adjusted under 35 U.S.C. 154(b) by 0 days.

(21) Appl. No.: 09/968,852

(22) Filed: Oct. 3, 2001

(65) Prior Publication Data

US 2002/0092191 A1 Jul. 18, 2002

Related U.S. Application Data

(60) Provisional application No. 60/261,257, filed on Jan. 16, 2001.

(51) Int. Cl.$^7$ .................................................. G01B 5/25
(52) U.S. Cl. .............................. 33/529; 33/412; 33/1 N; 33/645
(58) Field of Search .......................... 33/529, 424, 426, 33/412, 286, 533, 613, 645, 413, 370, 371, 1 R, 1 LE, 1 N, 281, 282, 285, 534, 430, 484, 485, 486, 347

(56) References Cited

U.S. PATENT DOCUMENTS

| | | | | |
|---|---|---|---|---|
| 961,555 A | * | 6/1910 | Tedesco | 33/529 |
| 2,334,422 A | | 11/1943 | Lehnus | 33/75 |
| 2,466,464 A | | 4/1949 | Moore | 33/175 |
| 2,502,660 A | | 4/1950 | McLean | 33/75 |
| 2,717,454 A | | 9/1955 | Sekki | 33/174 |
| 2,827,708 A | | 3/1958 | De Peu | 33/174 |
| 2,832,152 A | * | 4/1958 | Blackshaw | 33/529 |
| 2,832,153 A | * | 4/1958 | Binkley | 33/529 |
| 2,899,750 A | | 8/1959 | Becroft | 33/75 |
| 3,038,261 A | | 6/1962 | Blain | 33/180 |
| 3,060,587 A | | 10/1962 | Picken | 33/174 |
| 3,200,505 A | | 8/1965 | Hedges | 33/180 |
| 3,807,050 A | * | 4/1974 | Showalter | 33/1 N |
| 3,959,885 A | * | 6/1976 | Edmiston | 33/1 R |
| 4,497,119 A | * | 2/1985 | Dearman | 33/464 |
| 5,419,053 A | * | 5/1995 | Kathan | 33/413 |
| D363,239 S | | 10/1995 | Spirer et al. | D10/65 |

FOREIGN PATENT DOCUMENTS

| | | | | |
|---|---|---|---|---|
| GB | | 2139365 | 11/1984 | |
| GB | | 2193929 A | * 2/1988 | B43L/13/00 |

* cited by examiner

*Primary Examiner*—Diego Gutierrez
*Assistant Examiner*—Amanda J. Hoolahan
(74) *Attorney, Agent, or Firm*—Richard C. Litman

(57) ABSTRACT

A pipefitter's protractor is used to measure the angle between two separate pipes having an intersecting point. The protractor assembly includes a pipe attachment bar secured to the squared end of one pipe, with a protractor arm extending from the center of the pipe attachment bar and concentric with the centerline of the pipe. The protractor extends from the arm, with the arm and protractor rotating about the pipe attachment bar fitting to align the protractor plate coplanar with the plane defined by the pipes. The protractor is adjusted along the protractor arm to position the protractor origin at the intersection of the pipe centerlines, and a line is run from the origin to the center of the second pipe. The angle between the pipes and the distances from the protractor origin to the ends of each pipe are then used for fabricating an elbow to join the pipes.

20 Claims, 4 Drawing Sheets

PIPEFITTER'S PROTRACTOR

CROSS-REFERENCE TO RELATED APPLICATION

This application claims the benefit of U.S. Provisional Patent Application Serial No. 60/261,257, filed Jan. 16, 2001.

BACKGROUND OF THE INVENTION

1. Field of the Invention

The present invention relates generally to gauges and measuring devices, and more particularly to an adjustably positionable protractor for temporary placement on the end of a section of pipe, for measuring the angle between that pipe and another pipe for fabricating an elbow having the proper angle for joining the two pipes. The present protractor includes a pipe attachment bar for temporary placement across the end of a pipe, with a protractor extension bar or arm and protractor thereon extending from the center of the pipe attachment bar. The assembly includes various adjustments for different pipe diameters, relative orientations of the pipes, and other factors.

2. Description of Related Art

Pipefitters and related workers are often confronted with the need to connect two existing runs of pipe to one another, where the angle between the two pipes is predetermined by the existing locations of the two pipe runs. The angle between the pipes is of course critical, in that it determines the angle of the elbow which must be used to interconnect the two pipes.

In many, or perhaps most, cases, the angle between the two existing pipes is something other than that of a conventional elbow of thirty, forty five, or sixty degrees. This angle must of course be measured precisely in order to fabricate an elbow of the proper angle. Such custom fabrication may be encountered in many different environments, but is particularly true in the energy production industry in coal, gas, and petroleum processing plants and refineries, where large diameter pipe runs must be modified from time to time as different processing lines or tanks are installed or modified, etc.

Accordingly, a need will be seen for a pipefitter's protractor which can precisely measure the angle between two existing pipes. The present protractor accomplishes this by centering the protractor along the centerline of one of the pipes, with a string or line extended to the center of the second of the two pipes. The resulting angle of the line on the protractor, indicates the angle of the elbow required to connect the two pipes. The present protractor is also linearly adjustable along the length of the pipe to which it is secured, thus also providing an indication of the length of pipe needed from the end of the existing pipe to the angular center of the elbow.

A discussion of the related art of which the present inventor is aware, and its differences and distinctions from the present invention, is provided below.

U.S. Pat. No. 2,334,422 issued on Nov. 16, 1943 to Carl H. Lehnus, titled "Pipe Protractor," describes a device for cutting or marking pipes or cylindrical objects about their circumferences. The Lehnus device comprises a bracket which is secured to a pipe or the like by a chain which is secured around the pipe. A protractor is provided at the end of the bracket, with the protractor having a series of interconnected links extending therefrom. The links are fixed in one plane, and can only be adjusted in a plane passing around the pipe. The protractor is adjusted at the desired angle and the links are extended around the pipe, with the cutting or marking line falling along the plane defined by the links. This device cannot be extended to another pipe in order to determine the angle between two pipes, as provided by the present invention.

U.S. Pat. No. 2,466,464 issued on Apr. 5, 1949 to James W. Moore, titled "Pipe Pattern Maker," describes a device for marking the side of a pipe or other cylindrical object to join a similarly shaped object thereto. The Moore device comprises a series of plates with a series of holes formed therethrough to define various diameters, and accepting series of pins. The pins are arranged to define a circular pattern of the desired diameter, and a center reference pin with a protractor at the distal end thereof serves to measure the desired angle. The pins serve to mark the elliptical pattern on the subject pipe, for joining the other pipe thereto. As in the device of the Lehnus '422 U.S. Patent discussed immediately above, the Moore device cannot measure an angle between two pipes, but only marks one pipe after the angle is known.

U.S. Pat. No. 2,502,660 issued on Apr. 4, 1950 to Joseph A. McLean, titled "Device For Scribing Pipes," describes another device for marking a line about a pipe for cutting or other work. The McLean device comprises a protractor which is secured rigidly along the length of the pipe, by a pair of bands which extend about the pipe. A line is extended from the origin of the protractor, around the pipe, and back to the origin, with the angle of the line being adjusted as desired to position the line for marking or cutting the pipe. Thus, the McLean device is more closely related to the device of the Lehnus '422 U.S. Patent than to the present invention, as the McLean device cannot be used to determine an angle between two pipe runs, which is the function of the present pipefitter's protractor invention.

U.S. Pat. No. 2,717,454 issued on Sep. 13, 1955 to Rudolph O. Sekki, titled "Pipe Layout Gauge," describes a device for scribing a pipe for cutting through a plane passing through the pipe. The device comprises a laterally expandable saddle which is placed over the pipe. A pair of separable semielliptical plates are secured around the pipe and to the saddle, and aligned as desired according to a protractor on the side of the saddle. The cutting line is marked along the plane of the semielliptical plates. The Sekki device cannot measure an angle between two pipe runs for fabricating an elbow joining the two, as provided by the present invention. The Sekki device will thus be seen to be more closely related to the devices of the Lehnus '422 and McLean '660 U.S. Patents discussed above, than to the present invention.

U.S. Pat. No. 2,827,708 issued on Mar. 25, 1958 to Evans A. De Peu, titled "Pipe Cutting Indicator," describes two embodiments of a device for laying out a cutting line around the circumference of a pipe. As in the Lehnus '422 and Sekki '454 U.S. Patents discussed above, De Peu provides a saddle or shoe which is seated along the surface of the pipe. A protractor extends from the saddle, either across or parallel to the plane of the pipe, depending upon the embodiment. A guide extends from the protractor and is adjusted to the desired angle for marking or cutting the pipe in the desired plane. As in the other devices discussed above, the De Peu device cannot measure an angle between the centerlines of two intersecting pipe runs for fabricating an elbow joining the two, as provided by the present invention.

U.S. Pat. No. 2,899,750 issued on Aug. 18, 1959 to James O. Becroft, titled "Measuring Device For Pipes," describes a device for determining the setback from the intersection of the centerlines of two pipes, for fabricating or assembling an elbow connecting the two pipes. The Becroft device comprises a pair of arms arcuately secured together at a mutual origin point. One of the arms includes a scale for different pipe diameters, while the other arm includes a scale indicating the setback from the intersection of the centerlines of the pipes. Neither of the scales of the Becroft device includes a scale calibrated in degrees of arc for measuring an angle, as provided by the present invention; this must be accomplished in order to determine the angle of the elbow, which problem Becroft does not address.

U.S. Pat. No. 3,038,261 issued on Jun. 12, 1962 to Griffin C. Blain, titled "Pipe Layout Apparatus And Method," describes an apparatus for determining the layout for a pipe used for interconnecting two non-coplanar pipes. The Blain device is relatively complex, comprising two separate base components which fit respectively on each pipe. One of the base components includes a protractor. A line is extended between a pivot for the protractor and a similar pivot extending from the base component of the opposite pipe, and the angle of the line relative to the protractor is noted. At this point, another device such as the device of the Lehnus '422 U.S. Patent discussed further above, must be used to lay out the cutting angle, i.e., half of the angle indicated by the interconnecting line and protractor. All of the above difficulties are easily overcome with the present protractor invention, merely by welding (or otherwise attaching) a stock elbow of the appropriate diameter to one of the pipes, with the open end of the elbow in alignment with the second pipe. The present pipefitter's protractor may then be used to develop a second elbow to connect the second pipe to the first elbow. The result is a joint having two elbows or angles, which is the same finished configuration developed with the complex device of the Blain U.S. Patent. Moreover, Blain does not provide any means of aligning his device with the centerline of either pipe, nor for adjusting the position of his protractor axially along the centerline of one of the pipes, as provided by the present invention for measuring the angle required for construction of an elbow.

U.S. Pat. No. 3,060,587 issued on Oct. 30, 1962 to William Picken, titled "Pipe Bending Gauge," describes a device which is clamped to the side of a pipe parallel to the plane of the bend to be made in the pipe. A protractor indicates the degree of bend produced during the bending operation. The Picken device is also adjustable to accommodate incremental bends over a section of pipe to complete the total angular change of direction of the pipe. The Picken device is thus directed to measuring the bend angle in a pipe undergoing bending, and is not adapted for use in measuring the angle between two angularly displaced pipes for constructing an interconnecting elbow, as provided by the present invention. The Picken device must be offset from the centerline of the pipe undergoing the bending, and cannot be aligned with the axis of the pipe, as provided by the present pipefitter's protractor.

U.S. Pat. No. 3,200,505 issued on Aug. 17, 1965 to Ralph G. Hedges, titled "Protractor Guide For Bending Pipes," describes a device serving much the same purpose as the device of the Picken '587 U.S. Patent discussed immediately above. The Hedges guide merely measures the incremental series of bends formed in a pipe to complete the desired total bend. It cannot measure an angle between two separate pipes, as provided by the present invention. Moreover, Hedges does not describe any specific means of aligning his protractor with the pipe being bent, other than describing "alignment bars" secured to each side of the protractor. Hedges does not disclose any means of positioning his protractor concentrically with the pipe, as provided by the present invention.

U.S. Pat. No. D-363,239 issued on Oct. 17, 1995 to Steven E. Spirer et al., titled "Cutting Guide Protractor," illustrates a design having a protractor with an elongate arm and what is apparently a clamp, extending therefrom. The jaws of the clamp are relatively shallow; it does not appear that the device is capable of attaching to a relatively large diameter pipe. In any event, the elongate arm appears to be angularly adjustable, along with the protractor, relative to the clamp. However, no means is apparent for aligning the arm concentrically with the axis of a pipe, nor for positioning the protractor outwardly from the pipe and along the centerline of the pipe, as provided by the present pipefitter's protractor invention.

Finally, British Patent Publication No. 2,139,365 published on Nov. 7, 1984 to Timothy C. Dearman, titled "Pipefitter's Protractor," describes a device which is used to hold two separate welder's squares for convenient manipulation. The Dearman device permits the two squares to be clamped to the protractor element, rather than being held by hand while attempting to measure an angle therebetween. Dearman does not provide any means for either concentrically or peripherally securing his device to a pipe, nor for measuring the angle between two separate pipes for fabricating an elbow joining the two pipes, as provided by the present pipefitter's protractor invention.

None of the above inventions and patents, taken either singly or in combination, is seen to describe the instant invention as claimed.

SUMMARY OF THE INVENTION

The present invention comprises a pipefitter's protractor, for measuring the angular difference between two pipes (or similar elongate structures) to be joined by an intermediate elbow. The present protractor permits the angle to be measured precisely, by placing the protractor along the extended centerline of one of the pipes and running a line to the centerline of the other pipe. An elbow having the required length for each leg and the proper included angle, may then be fabricated to join the two pipes.

The present pipefitter's protractor apparatus includes a graduated pipe attachment bar, having a center origin point. The scale extends to each side of the origin, with a pipe rim attachment clamp provided to each side of the origin. The pipe to which the device is to be attached is squared, i.e., the rim is made normal to the axis of the pipe, and the pipe attachment bar is secured to the rim of the pipe with the scale origin concentric with the pipe centerline.

A protractor extension bar or arm is secured to the center of the pipe attachment bar, and extends normal thereto along the extended centerline of the pipe. The protractor is secured to the extension arm, and a line is run from the origin of the protractor (which is located essentially along the extended centerline of the pipe) to a point along the centerline of the second pipe. The position of the protractor is adjusted along the protractor arm, to position the protractor origin in alignment with the centerlines of both pipes.

At this point, the angle of the line is read on the protractor and the distance from each pipe end is measured. An elbow having the required leg lengths and angle is then fabricated from these measurements. The present protractor may be used for related purposes as well, if so desired. For example, the pipe attachment bar may be used as a trammel bar or beam compass, by clamping a pivot in one of the clamps and a marker or scribe in the other of the clamps, and adjusting the clamps linearly along the scales as desired to mark or scribe a circle or arc of the desired diameter.

Accordingly, it is a principal object of the invention to provide a pipefitter's protractor for accurately measuring the angle between the centerlines of two pipes, for fabricating an elbow joining the two pipes.

It is another object of the invention to provide a pipefitter's protractor in which the protractor has an origin which is adjustably positionable at the intersection point of the centerlines of the two pipes to be joined.

It is a further object of the invention to provide a pipefitter's protractor in which the protractor is secured to an attachment arm concentric with the centerline of one of the pipes, with the attachment arm rotationally mounted to a pipe attachment bar for allowing the plane of the protractor to swivel to lie coplanar with the plane defined by the two pipes.

Still another object of the invention is to provide a pipefitter's protractor including a pipe attachment bar which is convertible for use as a trammel bar for marking circles and arcs.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
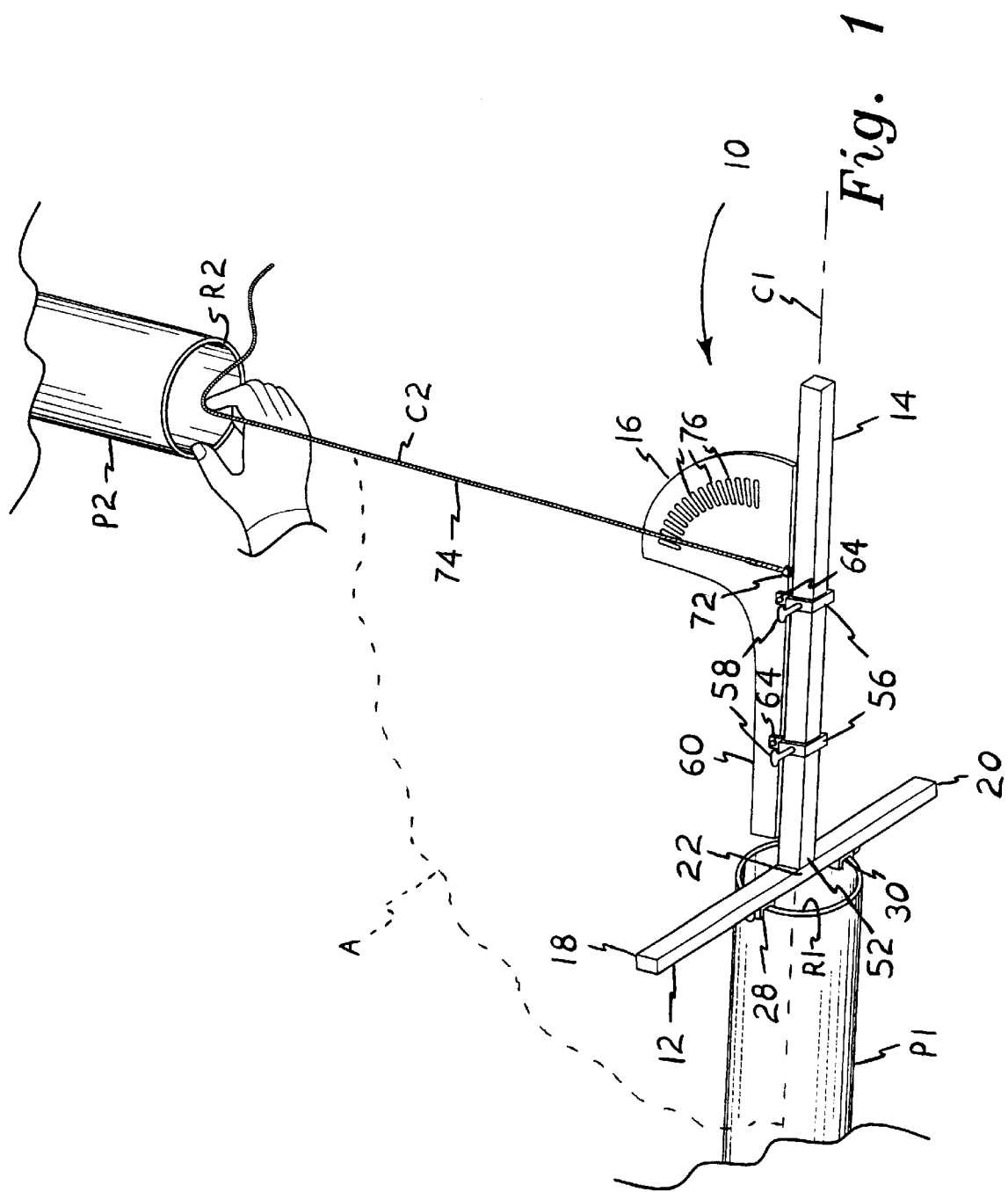
FIG. 1 is an environmental perspective view of a pipefitter's protractor according to the present invention, showing its use in measuring the angle between the centerlines of two pipes.

The present invention comprises a pipefitter's protractor, for precisely measuring the angle between two pipes for fabricating an elbow joining the two pipes. The present protractor is capable of determining the angle between the two centerlines of two pipe, and also determining the distance from each pipe end to the intersection of their two centerlines. FIG. 1 of the drawings provides a general view of the operation of the present pipefitter's protractor, designated by the reference numeral 10 throughout the drawings. The protractor 10 essentially includes a pipe attachment bar 12, with a protractor arm 14 removably and rotationally secured to and extending from the pipe attachment bar 12 and a protractor blade 16 removably secured to and extending from the protractor arm 14.

Figure 2:
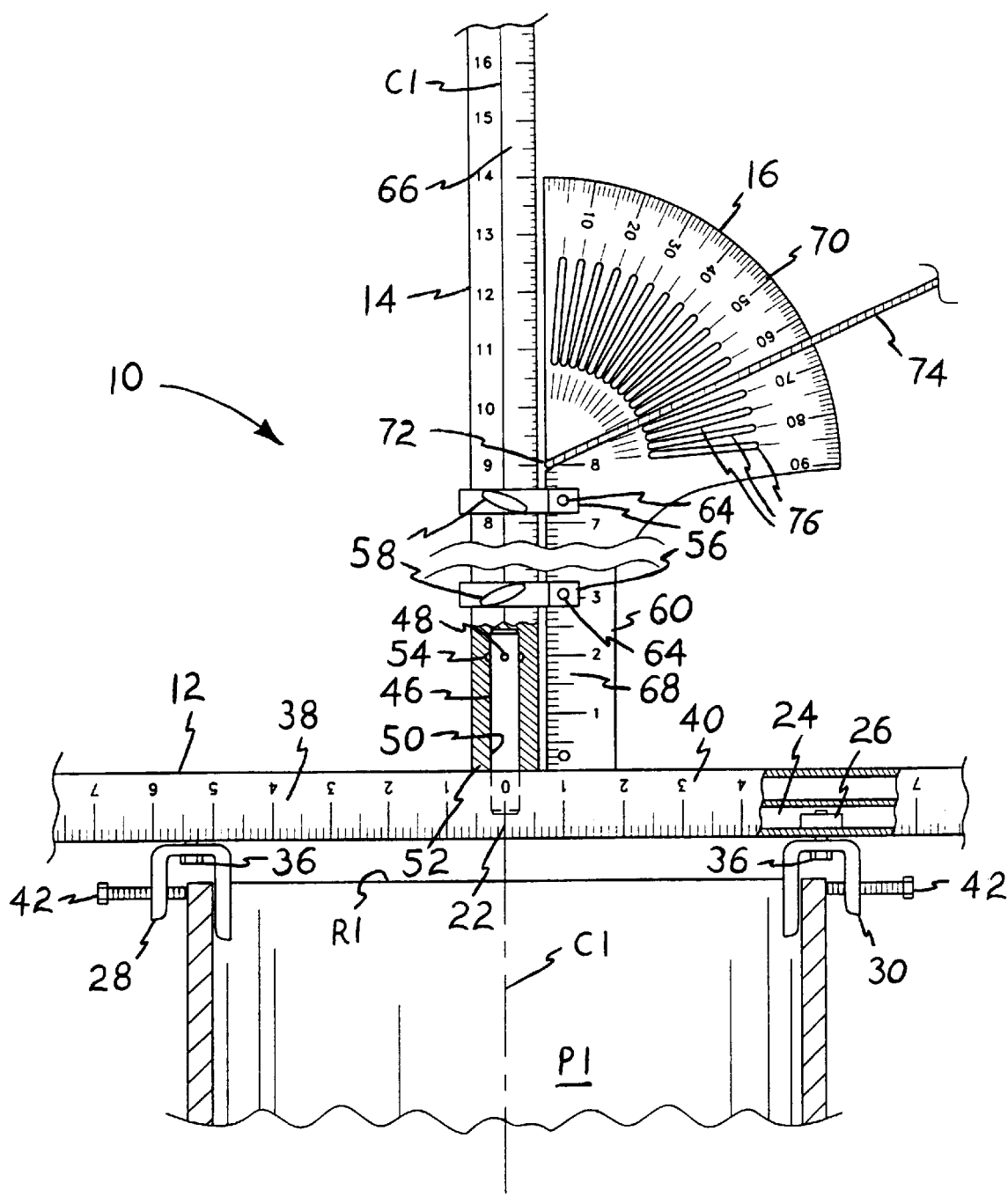
FIG. 2 is a fragmented detail front elevation view of the present pipefitter's protractor assembly attached to a pipe, showing further structural and functional details thereof.
Figure 3:
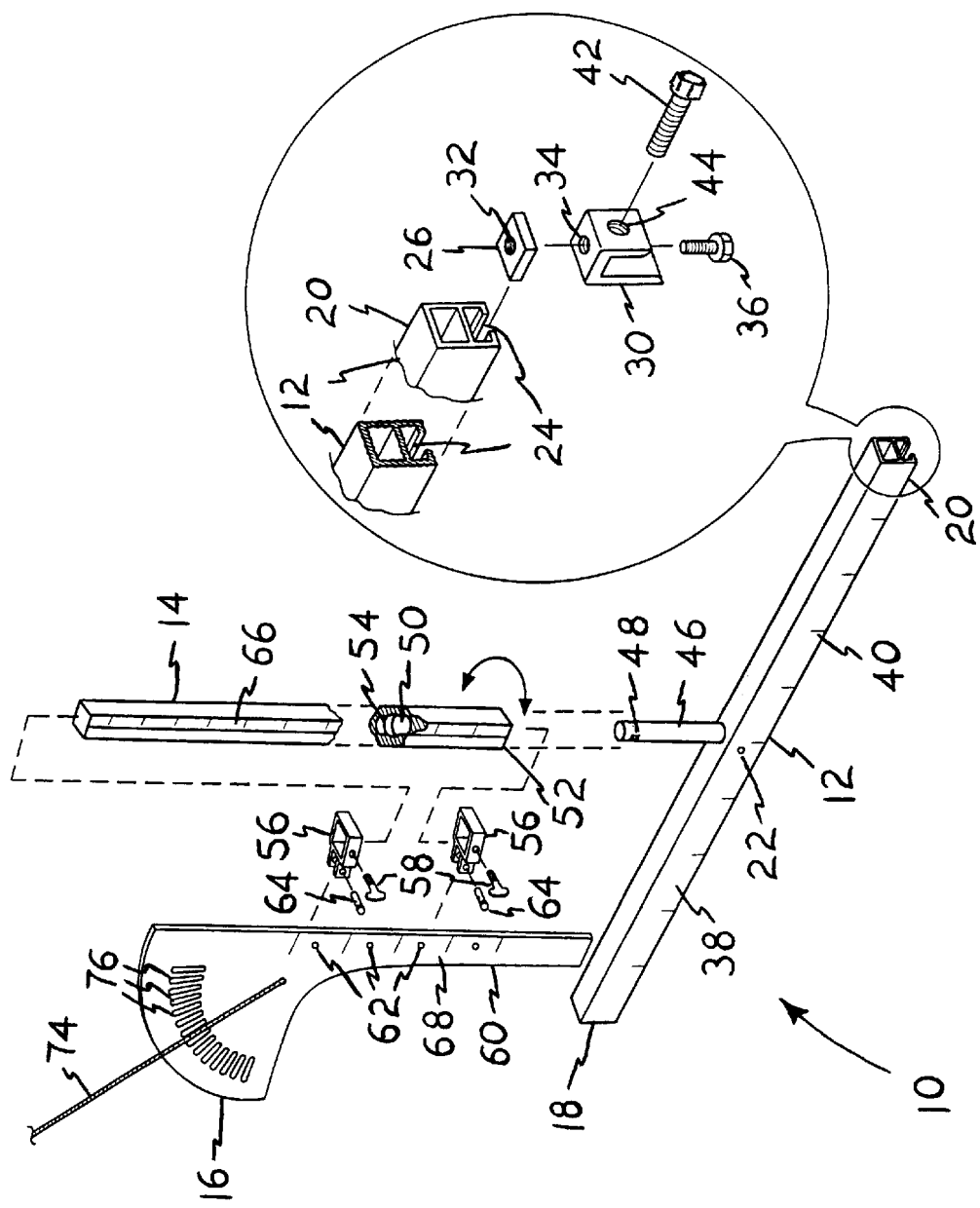
FIG. 3 is an exploded detail perspective view of the present pipefitter's protractor invention, showing further details of the various components thereof.

The pipe attachment bar 12 is formed of a hollow extrusion having opposite first and second ends, respectively 18 and 20, symmetrically disposed from a centerpoint 22 with a longitudinally slotted channel 24 extending continuously from end to end, as shown in FIGS. 2 and 3 of the drawings. (The pipe attachment bar 12 may include a longitudinal web dividing the interior into two separate areas, if so desired, but this is not required for the function of the present protractor.) The channel 24 provides for the adjustable installation of a pair of chocks 26 therein, one of which is shown in FIGS. 2 and 3, for the longitudinally adjustable attachment of first and second pipe rim attach clamps 28 and 30 to the bar 12.

Each of the chocks 26 comprises a rectangular block with a threaded passage 32 extending therethrough, normal to the length of the elongate channel 24 of the pipe attachment bar 12 (shown in the detail of FIG. 3). The two clamps 28 and 30 each have a generally C-shaped configuration with a pair of passages therethrough. One unthreaded passage 34 passes through the center of each clamp 28 and 30, with a pipe bar attachment bolt 36 passing through each central clamp passage 34 to engage a respective chock 26 within the channel 24 of the pipe attachment bar 12. The bolts 36 are loosened slightly to allow each clamp, chock, and bolt assembly to be adjusted along the channel 24 of the pipe attachment bar as desired, and tightened to secure the clamps 28 and 30 at the desired locations along the pipe attachment bar 12.

Normally, each clamp 28 and 30 is positioned symmetrically from the bar centerpoint 22, with the span between the two clamps 28 and 30 equal to the diameter of the pipe P1 and the centerpoint 22 of the bar 12 concentric with the centerline C1 of the pipe P1, as shown in FIG. 2. The pipe attachment bar 12 includes two opposed scales, respectively 38 and 40, which extend outwardly along the bar 12 from their origin at the centerpoint 22 for positioning the clamps 28 and 30 as desired. A pipe rim clamping bolt 42 is secured through a threaded passage 44 formed in the outboard arm of each of the clamps 28 and 30. These two bolts 42 are used to clamp each of the clamps 28 and 30 to the rim R1 of the pipe P1, thereby securing the pipe attachment arm 12 to the rim R1 of the pipe P1 generally as shown in FIGS. 1 and 2.

Figure 4:
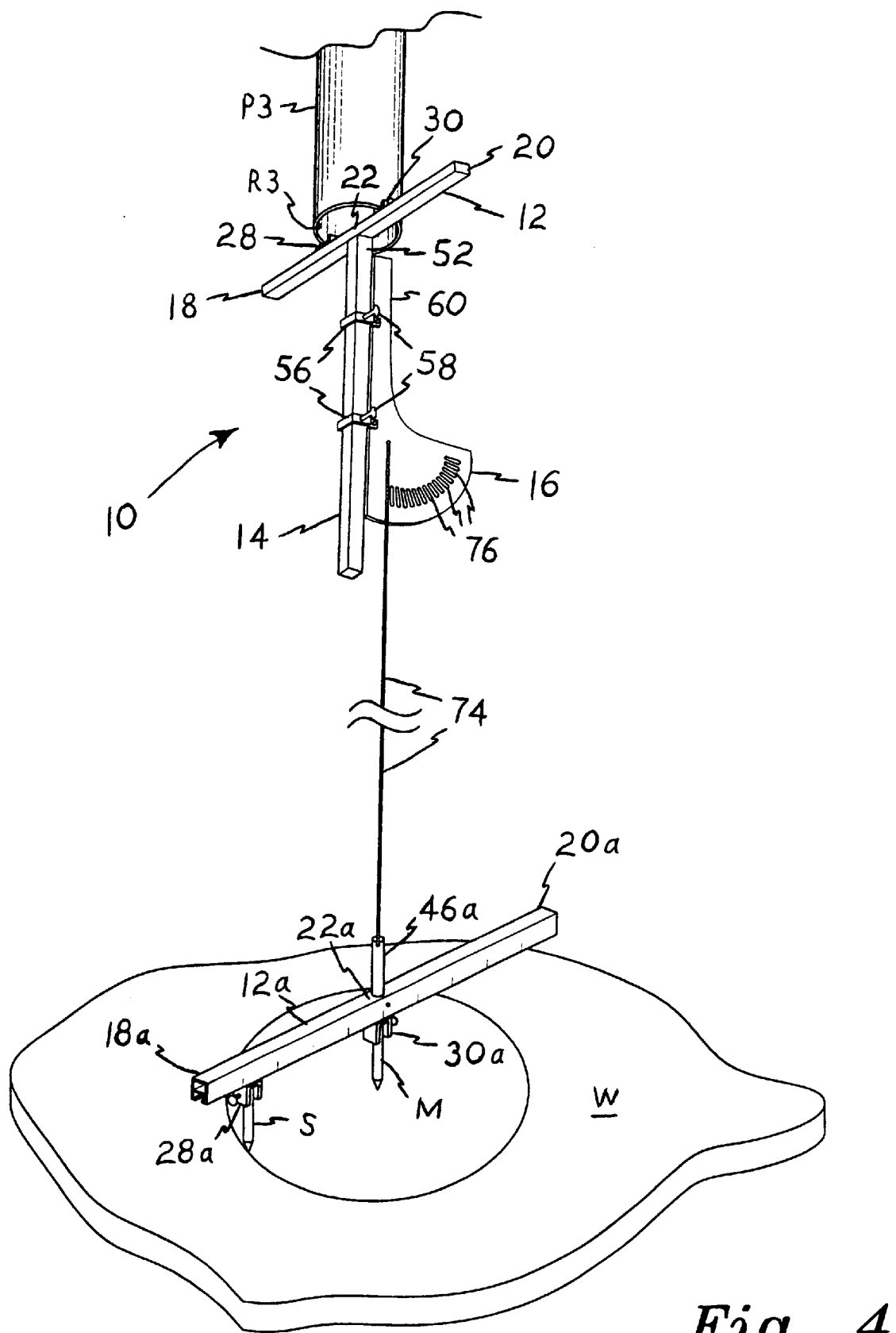
FIG. 4 is a perspective view showing a method of using the pipe attachment arm of the present pipefitter's protractor invention as a trammel bar for laying out a circle.

A cylindrical protractor arm attachment pin 46 extends from the centerpoint 22 of the pipe attachment bar 12 and normal thereto, generally as shown in FIGS. 2 through 4 of the drawings. This aligns the protractor arm 14 concentric with the centerline C1 of a pipe P1 when the centerpoint 22 of the pipe attachment bar 12 is adjusted to be on the pipe centerline C1, as shown in FIG. 2 of the drawings. The pin 46 is a "pip" pin, having a conventional spring loaded retaining ball 48 installed in the distal end thereof. (A lateral passage may be provided through the distal end of the pin 46 as well, for reasons illustrated in FIG. 4 of the drawings and described further below.) The protractor arm 14 includes a blind receptacle 50 formed concentrically in its attachment end 52, with the receptacle 50 including a circumferential groove 54 broached or otherwise formed near the distal end of the receptacle 50. The groove 54 captures the pip ball 48 of the protractor arm attachment pin 46 releasably therein, allowing the protractor arm 14 to rotate on the pin 46 as required.

The protractor blade 16 is removably and adjustably secured to the protractor arm 14 by a pair of protractor blade attachment fittings 56 which are slidably secured to the protractor arm 14. Each fitting 56 comprises a protractor arm passage which fits closely about the protractor arm 14, e.g., a square passage for the square cross section protractor arm illustrated. One side of the passage has a threaded hole, into which a hand tightenable screw 58 (i.e., "thumb screw") is installed to lock each attachment fitting 56 to the protractor arm 14 as desired.

Each fitting 56 also includes a pair of spaced apart lugs between which the protractor blade 16, or more precisely the protractor extension 60 which extends from the protractor blade 16, is installed to place the extension 60 parallel to the protractor arm 14 and thus to the centerline of the pipe to which the assembly 10 is secured. The extension 60 includes at least two holes or passages 62 therethrough, with the holes of the attachment fitting lugs being aligned with a pair of the protractor blade extension holes 62 and secured in place by corresponding pins 64; this detail is best shown in FIG. 3 of the drawings. This structure secures the attachment fittings 56 to the protractor blade 16 and its extension 60 in only a limited number of finite locations, depending upon the number and positioning of the attachment holes 62. However, the thumb screw clamping means provided for securing the attachment fittings 56 to the protractor arm 14, provide infinitesimally fine adjustment of the protractor blade 16 (and its extension 60) relative to the length of the protractor arm 14.

Both the protractor arm 14 and the protractor extension 60 include linear scales thereon, respectively 66 and 68. The scale 66 of the protractor arm 14 begins at some positive point above zero, at the attachment end 52 of the protractor arm 14. This allows for the thickness of the pipe attachment bar 12, with the zero point of the protractor arm scale thus being coplanar with the rim R1 of the pipe P1 to which the assembly is installed. The protractor blade extension scale 68 provides an additional linear scale arm for positioning the protractor origin from the pipe rim.

The protractor blade 16 includes an arcuate scale 70 along the arcuate rim thereof, as shown in FIG. 2, for measuring the angle between the centerlines of two pipes P1 and P2 when the present invention is secured to one of the pipes P1. An angular origin point or position 72 is also provided on the protractor blade 16, with the angular scale 70 markings radiating from the origin point 72. Preferably, the origin point 72 comprises a small hole or slot located at or adjacent the attachment edge of the protractor blade 16 and extension 60, in order to position the origin as closely as possible to the centerline C1 of a pipe P1, and thus generally on that centerline C1, when the present pipefitter's protractor 10 is installed thereon as shown in FIGS. 1 and 2. A line 74 (string, etc.) is secured to the protractor origin point 72, for extending along the centerline C2 of the second pipe P2 for determining the angle between the centerlines C1 and C2 of the two pipes P1 and P2, generally as shown in FIG. 1 of the drawings.

By positioning the protractor origin 72 as closely as possible to the pipe centerline, very little extrapolation of the exact point where the angle of the second pipe centerline C2 meets the first pipe centerline C1, need be made. However, the protractor scale 70 and origin point 72 may be adjusted away from the attachment edge, if so desired, with it being understood that any acute angle measured by the protractor 14 and line 72 must be extended to the centerline C1 of the pipe P1 in order to determine the linear point along the centerline C1 where the centerline C2 of the pipe P2 meets the first centerline C1.

The centerlines C1 and C2 of the two pipes P2 and P2 define a plane A, in accordance with elementary geometry theory. The angle between the two pipe centerlines C1 and C2 must be measured within this plane A, for optimum accuracy. However, the construction of the present pipefitter's protractor 10 does not require any particular accuracy or alignment in initially securing the device to the pipe P1, but only in making the linear and angular measurements after the device has been secured to the pipe P1. The pipe attachment bar 12 may be secured across the rim R1 of the pipe P1 in any convenient orientation; it need not be aligned at any particular angle relative to the second pipe centerline C2. This is due to the rotational attachment of the protractor arm 14, and thus the protractor blade 16, to the pipe attachment bar 12 by means of the attachment pin 46. The protractor arm 14 and its attached protractor blade 16 and extension 60, rotate completely about the pin 46 to align the protractor blade 14 and extension 60 in the plane A as defined by the two pipe centerlines C1 and C2, thus providing accurate orientation of the protractor blade 14 with the second pipe centerline C2, generally as shown in FIG. 1.

FIG. 1 illustrates the setup and use of the pipefitter's protractor 10. The rims R1 and R2 of the two pipes P1 and P2 are preferably first cut to be normal or square with their respective pipe centerlines C1 and C2. This assures that the protractor arm 14, and thus the attachment edge of the protractor 16 and its extension 60, will lie along or closely adjacent and parallel to the pipe centerline C1 when the device is secured to the pipe P1.

The present invention is used by initially adjusting the first and second clamps 28 and 30 along the protractor bar 12 for the diameter of the pipe P1 to which the device is to be secured. In the example of a fifteen inch diameter pipe, each clamp 28 and 30 would be positioned seven and one half inches from the centerpoint 22 of the pipe attachment bar 12. More generally, each clamp 28 and 30 is adjusted outwardly from the centerpoint 22 a distance equal to the radius of the pipe. The two clamps 28 and 30 are locked in position along the pipe attachment bar 12 by tightening their respective bolts 36 to hold them immovably in position.

The pipe attachment bar 12 is then secured to the rim R1 of the pipe P1 by tightening the respective two bolts 42 against the rim R1 of the pipe P1. The protractor arm 14 is then pivotally installed on the pin 46, with the arm 14 automatically positioned along and parallel to the first pipe centerline C1 when the pipe attachment bar 12 has been properly secured to the pipe P1.

The protractor blade 16 is then installed on the protractor arm 14, if this step has not previously been accomplished. The blade 16 is not locked down to the protractor arm 14 at this point, as some fine adjustment must be made to align the origin point 72 of the protractor blade 16 with the second pipe centerline C2. However, the protractor blade 16 may be pinned to its respective attachment fittings 56, which are left loose relative to the protractor arm 14 to allow fine adjustment of the position of the protractor blade 16 along the protractor arm 14 and first pipe centerline C1.

The line 74 is then extended to the center of the second pipe P2, generally as shown in FIG. 1 of the drawings. (If greater accuracy is desired, a second protractor assembly 10 may be secured to the second pipe rim R2, and the line 74 aligned with the second assembly protractor arm.) The line 74 will be aligned with the second pipe centerline C2 at only one linear position of the protractor blade 16 along the protractor arm 14. Leaving the two protractor attachment fittings 56 loose on the protractor arm 14, allows the blade 16 to be adjusted linearly along the arm 14 as required, until the line 74 is precisely aligned with the second pipe centerline C2. At this point, the two thumbscrews 58 are tightened to lock the protractor blade 16 to the protractor arm 14.

The pipefitter may now note both the angle required for the elbow to be fabricated and installed between the two pipes P1 and P2, and also the distances from the rims R1 and R2 of the two pipes to the centerpoint of the elbow, which is defined by the origin point 72 of the protractor blade 16. The distance from the first pipe rim R1 to the elbow centerpoint is read directly from the protractor arm linear scale 66 and/or the protractor extension linear scale 68, as required. The distance from the elbow centerpoint to the second pipe rim R2 is easily determined by measuring the length of the line 74 to the second pipe rim R2, or extending a tape measure from the protractor blade origin 72 to the end of the second pipe P2. The opaque protractor blade 16 may include a series of viewing slots 76 therethrough, to allow viewing the line 74 from the opposite side of the blade 16 if required.

FIG. 4 of the drawings illustrates an alternative use of the present pipefitter's protractor invention in laying out a circle aligned with a pipe, as in a pipe P3 which must pass through a wall W or join a larger tank, etc. In FIG. 4, the pipefitter's protractor 10 is secured to the rim R3 of the pipe P3 generally in the manner described above for installing the protractor assembly 10 to the pipe P1 of FIG. 1. A second pipe attachment arm 12a is provided with a center marking device M, such as a centerpunch, etc. secured into one of the two pipe rim clamps, e.g., clamp 30a, by tightening the rim clamping bolt therein. This clamp 30a is positioned at the centerpoint 22a of the bar 12a, to act as the origin for the circle to be swung using the arrangement of FIG. 4. The opposite clamp 28a is used to secure a scribe S or other marking device therein.

The line 74 is secured to the protractor arm attachment pin 46a of the second pipe attachment bar 12a, and used to align the centerpoint 22a of the pipe attachment bar 12a directly in line with the centerline of the pipe P3. In the example of FIG. 4, the pipe P3 is shown in a vertical orientation, with the second pipe attachment bar 12a assembly acting as a plumb bob. Alternatively, a separate plumb bob may be used conventionally to mark the location of the center of the circle to be cut. It will be further noted that the arrangement of FIG. 4 is not limited to use with only vertically oriented pipes, but that other pipe orientations may be accommodated by aligning the line 74 with the centerline of the pipe and marking a centerpoint for the circle.

At this point, the second pipe attachment bar 12a is used as a trammel bar, by swinging the scribe S or other marker around the stationary centerpoint defined by the marker or punch M. While the circle thus defined may be relatively larger than the pipe P3 to provide clearance for an extension of the pipe P3, as illustrated, it will be seen that the distance of the clamp 28a from the centrally positioned clamp 30a may be adjusted to equal the radius of the pipe P3 to provide a close fit for situations where the pipe P3 is to be connected to a tank or other situations where a leakproof connection is required.

In conclusion, the present pipefitter's protractor provides a much needed improvement in the tools, equipment, and procedures used in laying out connections between non-concentric pipes. The present invention is relatively inexpensive, easy to use, and provides great versatility with its pivotally attached protractor arm and longitudinally adjustable protractor blade along the protractor arm. All three of the basic measurements required for the fabrication of an elbow between two pipes, i.e., the two distances to the centerpoint of the elbow and the angle between the two pipe centerlines, are easily determined with one setup of the present protractor invention. The device is further adaptable to virtually any pipe diameter, limited only by the span of the pipe attachment bar. The present pipefitter's protractor will thus prove to be an extremely valuable piece of equipment wherever pipe construction or relocation, or other related work is required.

It is to be understood that the present invention is not limited to the sole embodiment described above, but encompasses any and all embodiments within the scope of the following claims.

I claim:

1. A pipefitter's protractor for measuring the angle between a first pipe and a second pipe for fabricating an elbow therebetween, with each pipe having a rim and a mutually intersecting centerline defining a plane, comprising:

a pipe attachment bar;

a protractor arm, removably secured to said pipe attachment bar;

a protractor blade, removably secured to said protractor arm;

a protractor origin position disposed upon said protractor blade;

a line extending from said protractor origin position; and means for locating said protractor origin position generally concentrically along the centerline of at least one pipe.

2. The pipefitter's protractor according to claim 1, wherein said means for locating said protractor origin position generally concentrically along the centerline of at least one pipe, comprises:

a centerpoint disposed upon said pipe attachment bar;

symmetrically opposed first and second linear scales extending from said centerpoint of said pipe attachment bar;

first and second pipe rim attachment clamps adjustably installed along each of said linear scales of said pipe attachment bar, for equitably positioning along each of said linear scales and securing to the rim of the first pipe with said centerpoint of said pipe attachment bar disposed upon the centerline of the first pipe;

a protractor arm attachment pin extending from said centerpoint of said pipe attachment bar and normal thereto;

said protractor arm removably secured to said protractor arm attachment pin normal to said pipe attachment bar and extending along the centerline of the first pipe; and said protractor blade extending from said protractor arm with said protractor origin position disposed adjacent the centerline of the first pipe.

3. The pipefitter's protractor according to claim 2, further including means for adjustably positioning said protractor blade axially along the centerline of at least one pipe, comprising:

at least one protractor blade attachment fitting adjustably secured to said protractor arm; and said protractor blade being adjustably secured to said protractor arm by means of said at least one protractor blade attachment fitting, for adjustably positioning said protractor blade linearly along said protractor arm.

4. The pipefitter's protractor according to claim 2, further including means for aligning said protractor blade coplanar with the plane defined by the centerline of each pipe, comprising:

said protractor arm being rotationally secured to said protractor arm attachment pin; and said protractor blade extending from said protractor arm and rotationally alignable with the plane defined by the centerline of each pipe by means of said rotationally secured protractor arm extending from said centerpoint of said pipe attachment bar.

5. The pipefitter's protractor according to claim 2, wherein said pipe attachment bar further includes:
   a first end, a second end opposite said first end, and a continuous channel extending from said first end to said second end thereof;
   a first and a second chock slidingly captured within said channel;
   each said chock having a threaded passage therethrough and normal to said channel; and
   a clamp attachment bolt installed through each said clamp and adjustably secured to a respective said chock, for selectively tightening a respective said clamp at a predetermined position along a respective one of said linear scales as desired, for adjusting said pipe attachment bar for attachment to pipes of different diameters from one another.

6. The pipefitter's protractor according to claim 2, further including a linear measurement scale disposed upon said protractor arm.

7. The pipefitter's protractor according to claim 2, further including:
   a protractor extension depending from said protractor blade, and parallel to said protractor arm when said protractor blade is installed thereon;
   said protractor extension having a linear measurement scale disposed thereon; and
   a plurality of angular viewing slots formed through said protractor blade, for viewing said line therethrough.

8. A pipefitter's protractor for measuring the angle between a first pipe and a second pipe for fabricating an elbow therebetween, with each pipe having a rim and a mutually intersecting centerline defining a plane, comprising:
   a pipe attachment bar;
   a protractor arm, removably secured to said pipe attachment bar;
   a protractor blade, removably secured to said protractor arm;
   a protractor origin position disposed upon said protractor blade;
   a line extending from said protractor origin position; and
   means for adjustably positioning said protractor blade axially along the centerline of at least one pipe.

9. The pipefitter's protractor according to claim 8, wherein said means for adjustably positioning said protractor blade axially along the centerline of at least one pipe, comprises:
   a centerpoint disposed upon said pipe attachment bar;
   symmetrically opposed first and second linear scales extending from said centerpoint of said pipe attachment bar;
   first and second pipe rim attachment clamps adjustably installed along each of said linear scales of said pipe attachment bar, for equitably positioning along each of said linear scales and securing to the rim of the first pipe with said centerpoint of said pipe attachment bar disposed upon the centerline of the first pipe;
   a protractor arm attachment pin extending from said centerpoint of said pipe attachment bar and normal thereto;
   said protractor arm removably secured to said protractor arm attachment pin normal to said pipe attachment bar and extending along the centerline of the first pipe;
   at least one protractor blade attachment fitting adjustably secured to said protractor arm; and
   said protractor blade being adjustably secured to said protractor arm by means of said at least one protractor blade attachment fitting, for adjustably positioning said protractor blade linearly along said protractor arm.

10. The pipefitter's protractor according to claim 9, further including means for locating said protractor origin position concentrically along the centerline of at least one pipe, comprising said protractor blade extending from said protractor arm with said protractor origin position disposed adjacent the centerline of the first pipe.

11. The pipefitter's protractor according to claim 9, further including means for aligning said protractor blade coplanar with the plane defined by the centerline of each pipe, comprising:
   said protractor arm being rotationally secured to said protractor arm attachment pin; and
   said protractor blade extending from said protractor arm and rotationally alignable with the plane defined by the centerline of each pipe by means of said rotationally secured protractor arm extending from said centerpoint of said pipe attachment bar.

12. The pipefitter's protractor according to claim 9, wherein said pipe attachment bar further includes:
   a first end, a second end opposite said first end, and a continuous channel extending from said first end to said second end thereof;
   a first and a second chock slidingly captured within said channel;
   each said chock having a threaded passage therethrough and normal to said channel; and
   a clamp attachment bolt installed through each said clamp and adjustably secured to a respective said chock, for selectively tightening a respective said clamp at a predetermined position along a respective one of said linear scales as desired, for adjusting said pipe attachment bar for attachment to pipes of different diameters from one another.

13. The pipefitter's protractor according to claim 9, further including a linear measurement scale disposed upon said protractor arm.

14. The pipefitter's protractor according to claim 9, further including:
   a protractor extension depending from said protractor blade, and parallel to said protractor arm when said protractor blade is installed thereon;
   said protractor extension having a linear measurement scale disposed thereon; and
   a plurality of angular viewing slots formed through said protractor blade, for viewing said line therethrough.

15. A pipefitter's protractor for measuring the angle between a first pipe and a second pipe for fabricating an elbow therebetween, with each pipe having a rim and a mutually intersecting centerline defining a plane, comprising:
   a pipe attachment bar;
   a protractor arm, removably secured to said pipe attachment bar;
   a protractor blade, removably secured to said protractor arm;
   a protractor origin position disposed upon said protractor blade;
   a line extending from said protractor origin position; and means for aligning said protractor blade coplanar with the plane defined by the centerline of each pipe.

16. The pipefitter's protractor according to claim 15, wherein said means for aligning said protractor blade coplanar with the plane defined by the centerline of each pipe, comprises:

a centerpoint disposed upon said pipe attachment bar;

symmetrically opposed first and second linear scales extending from said centerpoint of said pipe attachment bar;

first and second pipe rim attachment clamps adjustably installed along each of said linear scales of said pipe attachment bar, for equitably positioning along each of said linear scales and securing to the rim of the first pipe with said centerpoint of said pipe attachment bar disposed upon the centerline of the first pipe;

a protractor arm attachment pin extending from said centerpoint of said pipe attachment bar and normal thereto;

said protractor arm removably and rotationally secured to said protractor arm attachment pin normal to said pipe attachment bar and extending along the centerline of the first pipe; and said protractor blade extending from said protractor arm and rotationally alignable with the plane defined by the centerline of each pipe by means of said rotationally secured protractor arm extending from said centerpoint of said pipe attachment bar.

17. The pipefitter's protractor according to claim 16, further including means for locating said protractor origin position concentrically along the centerline of at least one pipe, comprising said protractor blade extending from said protractor arm with said protractor origin position disposed adjacent the centerline of the first pipe.

18. The pipefitter's protractor according to claim 16, further including means for adjustably positioning said protractor blade axially along the centerline of at least one pipe, comprising:

at least one protractor blade attachment fitting adjustably secured to said protractor arm; and said protractor blade being adjustably secured to said protractor arm by means of said at least one protractor blade attachment fitting, for adjustably positioning said protractor blade linearly along said protractor arm.

19. The pipefitter's protractor according to claim 16, wherein said pipe attachment bar further includes:

a first end, a second end opposite said first end, and a continuous channel extending from said first end to said second end thereof;

a first and a second chock slidingly captured within said channel;

each said chock having a threaded passage therethrough and normal to said channel; and a clamp attachment bolt installed through each said clamp and adjustably secured to a respective said chock, for selectively tightening a respective said clamp at a predetermined position along a respective one of said linear scales as desired, for adjusting said pipe attachment bar for attachment to pipes of different diameters from one another.

20. The pipefitter's protractor according to claim 16, further including:

a linear measurement scale disposed upon said protractor arm;

a protractor extension depending from said protractor blade, and parallel to said protractor arm when said protractor blade is installed thereon;

said protractor extension having a linear measurement scale disposed thereon; and a plurality of angular viewing slots formed through said protractor blade, for viewing said line therethrough.

* * * * *